United States Patent
Sutton (10) Patent No.: US 9,663,016 B1
(45) Date of Patent: May 30, 2017

(54) SYSTEMS AND METHODS FOR A MOTORCYCLE MOUNT

(71) Applicant: Scott Sutton, Arvada, CO (US)

(72) Inventor: Scott Sutton, Arvada, CO (US)

(*) Notice: Subject to any disclaimer, the term of this patent is extended or adjusted under 35 U.S.C. 154(b) by 0 days.

(21) Appl. No.: 15/085,564

(22) Filed: Mar. 30, 2016

(51) Int. Cl.
  *B60P 7/08* (2006.01)
  *B60P 3/073* (2006.01)

(52) U.S. Cl.
  CPC .................. *B60P 3/073* (2013.01)

(58) Field of Classification Search
  CPC ....................................... B60P 3/073
  USPC .......... 410/2, 3, 7, 23, 8, 9, 19, 22, 94, 102; 211/21, 22; 248/500, 503
  See application file for complete search history.

(56) References Cited

U.S. PATENT DOCUMENTS

| | | |
|---|---|---|
| 3,297,293 A | 1/1967 | Andrews et al. |
| 3,366,256 A | 1/1968 | Meredith et al. |
| 3,675,833 A | 7/1972 | Barr |
| 3,753,579 A | 8/1973 | Kurilich, Jr. |
| 3,765,637 A | 10/1973 | Watts |
| 4,243,243 A | 1/1981 | Edmisten |
| 4,580,935 A | 4/1986 | Treihaft |
| 4,818,162 A | 4/1989 | Zukowski et al. |
| 4,842,458 A | 6/1989 | Carpenter |
| 4,960,353 A | 10/1990 | Thorndyke |
| 4,992,015 A | 2/1991 | Florence |
| 5,259,711 A | 11/1993 | Beck |
| 5,326,202 A | 7/1994 | Stubbs |
| 5,338,136 A | 8/1994 | Hetchler |
| 5,529,448 A | 6/1996 | Kosma |
| 5,749,685 A * | 5/1998 | Hain ...................... B60P 3/073 410/3 |
| 5,800,105 A | 9/1998 | Stump |
| 5,823,723 A | 10/1998 | Finch |
| 6,109,494 A | 8/2000 | Pilmore |
| 6,171,034 B1 | 1/2001 | Burgeon et al. |
| 6,328,511 B1 | 12/2001 | Cardona |
| 6,539,593 B2 | 4/2003 | Morris |
| 6,616,388 B1 | 9/2003 | Floe |
| 6,705,811 B1 | 3/2004 | Selby |
| 6,715,972 B2 | 4/2004 | Jackson, Sr. |
| 7,025,545 B1 | 4/2006 | Robison |
| 7,114,896 B2 | 10/2006 | Lantrip |
| 7,156,592 B1 * | 1/2007 | Cava ...................... B60P 7/15 410/121 |

(Continued)

FOREIGN PATENT DOCUMENTS

DE 102012101192 A1 8/2013
EP 2628635 A1 8/2013

(Continued)

*Primary Examiner* — Stephen Gordon
(74) *Attorney, Agent, or Firm* — Haynes and Boone, LLP (57) ABSTRACT

A framework assembly apparatus for use in a transport vehicle having a bed with a motorcycle having a foot pedal includes a track that attaches to the bed and has a longitudinal open channel. The framework assembly apparatus further includes an arm that has an upper end that engages the foot peg and a lower end that is connected to the track such that the arm pivots upwardly and downwardly from a fixed position on the track. The framework assembly apparatus further includes a holder that engages the foot peg and the arm in order to hold the motorcycle to the bed of the transport vehicle.

20 Claims, 6 Drawing Sheets

(56) References Cited

U.S. PATENT DOCUMENTS

| | | |
|---|---|---|
| 7,168,575 B2 | 1/2007 | Olsen, Jr. |
| 7,198,443 B2 | 4/2007 | Macomber, III |
| 7,287,942 B1 | 10/2007 | Valkenburgh |
| 7,316,530 B2 * | 1/2008 | Saldana ................. B60P 3/073 410/3 |
| 7,347,653 B1 | 3/2008 | Roberts |
| 7,416,373 B2 | 8/2008 | Mock |
| 7,641,086 B2 | 1/2010 | Green |
| 7,648,317 B2 | 1/2010 | Kobacker, II et al. |
| 7,785,050 B2 | 8/2010 | Fonseca, Jr. |
| 7,850,407 B2 | 12/2010 | Burry et al. |
| 8,348,561 B1 | 1/2013 | Bauer, Sr. |
| 8,439,610 B2 | 5/2013 | Mamie |
| 8,517,646 B2 | 8/2013 | Cencer |
| 8,662,803 B2 | 3/2014 | Bowman et al. |
| 8,678,726 B1 | 3/2014 | Stubbs |
| 2003/0059269 A1 | 3/2003 | Bosley |
| 2006/0163543 A1 | 7/2006 | Kobacker, II et al. |
| 2006/0177283 A1 | 8/2006 | Terry et al. |
| 2007/0189873 A1 | 8/2007 | Breeden |
| 2008/0124183 A1 | 5/2008 | Murphy |
| 2008/0174088 A1 | 7/2008 | Kobacker et al. |
| 2008/0273937 A1 | 11/2008 | Hanson |
| 2009/0155034 A1 | 6/2009 | Fonseca, Jr. |
| 2009/0232628 A1 | 9/2009 | Miller |

FOREIGN PATENT DOCUMENTS

| | | |
|---|---|---|
| GB | 2070523 A | 9/1981 |
| JP | S58174034 A | 10/1983 |

* cited by examiner

SYSTEMS AND METHODS FOR A MOTORCYCLE MOUNT

TECHNICAL FIELD

Some embodiments disclosed in this application relate to a device used to secure at least one motorcycle or other similar vehicle to the bed of a truck or floor of a transport vehicle including, but not limited to, recreational vehicles (RVs), toy haulers, and trailers.

BACKGROUND

Motorcycles and other similar vehicles traditionally are difficult to transport in the bed of a truck or transport vehicle. These vehicles have a high center of gravity and lack lateral stability, making them prone to shift or fall over, inflicting damage to one or more of the transported vehicles.

The most common methods of securing motorcycles or similar vehicles to a truck bed or other transport vehicle are by utilizing ropes or other tie-downs that are cumbersome, difficult to use, and must be completed by more than one user. Even when ropes, tie-downs, or other vehicle transport devices are not in use, those devices may occupy significant space in the transport vehicle rendering the transport vehicle ineffective at transporting or storing other objects.

Hence, there is a need for a device which enables one user to rapidly and easily secure one or more motorcycles or similar vehicles to the bed of a truck or the floor of a transport vehicle, but which does not occupy a large footprint, enabling the user to transport or store other objects without sacrificing space.

SUMMARY

In one embodiment, a framework assembly apparatus in a transport vehicle having a bed for use with a motorcycle having a foot peg includes a track having a longitudinal open channel, the track attached to the bed of the transport vehicle. The framework assembly apparatus further includes an arm, the arm having an upper end, the upper end engaging the foot pedal, the arm further having a lower end, the lower end connected to the track such that the arm pivots upwardly and downwardly from a fixed position on the track. The framework assembly apparatus further includes a holder, the holder engaging the foot peg and the arm in order to hold the motorcycle to the bed of the transport vehicle. In one alternative, the fixed position of the arm on the track is oriented such that the arm pivots into the longitudinal open channel such that it is approximately parallel in a first position and away from the longitudinal open channel such that it is not parallel in a second position. In another alternative, a sliding plate slides on the arm and engages the foot peg of the motorcycle and a pin inserted into the arm such that the pin secures the sliding plate over the foot peg of the motorcycle, thereby holding the motorcycle to the bed of the transport vehicle. Optionally, the pin is a cotter pin. In one configuration, the track includes a connector that attaches the track to the bed of the transport vehicle. In another configuration, the arm pivots such that the arm is substantially encapsulated in the longitudinal open channel of the track. Optionally, the track further includes a first hole of a pair of holes that is positioned opposite a second hole of the pair of holes, and the lower end of the arm includes a first hole of the lower end of the arm that is positioned opposite of a second hole of the lower end of the arm. In another alternative, the framework assembly apparatus further includes a post inserted through the first hole of the pair of holes of the track, the first hole of the lower end of the arm, the second hole of the lower end of the arm, and the second hole of the pair of holes of the track.

In another embodiment, a method of using a framework assembly in a transport vehicle having a bed to secure a motorcycle that has a first foot peg and a second foot peg includes a framework assembly, and the framework assembly includes a track having a longitudinal open channel. The framework assembly further includes a first arm and a second arm, the first arm having a first upper end, the first upper end engaging the first foot pedal, and the second arm having a second upper end, the second upper end engaging the second foot pedal; the first arm further having a first lower end, the first lower end connected to the track such that the first arm pivots upwardly and downwardly from a first fixed position on the track; the second arm further having a second lower end, the second lower end connected to the track such that the second arm pivots upwardly and downwardly from a second fixed position on the track. The framework assembly further includes a first sliding plate which slides on the first arm and engages the first foot peg of the motorcycle and a first pin inserted into the first arm such that the first pin secures the first sliding plate over the first foot peg of the motorcycle, thereby holding the motorcycle to the bed of the transport vehicle. The method further includes attaching the track to the bed, aligning the motorcycle with the track, aligning the first foot peg with the first arm, placing the first arm through the first foot pedal, applying a downward force to the motorcycle, compressing a suspension system of the motorcycle, sliding the first sliding plate onto the first arm on top of the first pedal, and placing the first pin through the first arm over the first sliding plate. In another configuration, the method of using a framework assembly includes a second sliding plate which slides on the second arm and engages the second foot peg of the motorcycle and a second pin inserted into the second arm such that the second pin secures the second sliding plate over the second foot peg of the motorcycle, thereby holding the motorcycle to the bed of the transport vehicle. The method further includes sliding the second sliding plate onto the second arm on top of the second pedal and placing the second pin through the second arm over the second sliding plate. Alternatively, the method further includes removing the first and second pins, removing the first and second arms from the first and second foot pedals, respectively, and releasing the motorcycle. Optionally, the method further includes folding the first arm and the second arm into the longitudinal channel.

In another embodiment, a framework assembly apparatus for use in a transport vehicle having a bed with a motorcycle that has a first foot peg and a second foot peg includes a track having a longitudinal open channel. The framework assembly apparatus further includes a first arm and a second arm, the first arm having a first upper end, the first upper end engaging the first foot pedal, the second arm having a second upper end, the second upper end engaging the second foot pedal; the first arm further having a first lower end, the first lower end connected to the track such that the first arm pivots upwardly and downwardly from a first fixed position on the track, the second arm further having a second lower end, the second lower end connected to the track such that the second arm pivots upwardly and downwardly from a second fixed position on the track. The framework assembly apparatus further includes a first sliding plate which slides on the first arm and engages the first foot peg of the motorcycle and a first pin inserted into the first arm such that the pin secures the first sliding plate over the first foot peg of the motorcycle, thereby holding the motorcycle to the bed of the transport vehicle. In one configuration, the first arm and the second arm rotate downward such that the first arm and the second arm are substantially encapsulated in the longitudinal open channel of the track. Optionally, the first pin is a cotter pin. In another configuration, the track includes a first hole of a plurality of pairs of holes that is positioned opposite of a second hole of the plurality of pairs of holes on opposite sides of the longitudinal open channel. Optionally, the framework assembly apparatus further includes the first lower end of the first arm having a first hole and a second hole and the second lower end of the second arm having a first hole and a second hole. Alternatively, the framework assembly further includes the first hole of the first lower end of the first arm opposite of the second hole of the first lower end of the first arm, and the first hole of the second lower end of the second arm opposite of the second hole of the second lower end of the second arm. In one configuration, the framework assembly apparatus further includes a first post that is inserted through a first hole of a first pair of holes of the plurality of pairs of holes of the track, through the first hole of the first lower end of the first arm, and through the second hole of the first lower end of the first arm. In another configuration, the framework assembly apparatus further includes a second post that is inserted through a first hole of a second pair of holes of the plurality of pairs of holes of the track, through the first hole of the second lower end of the second arm, and through the second hole of the second lower end of the second arm. In yet another configuration, the track is attachable to the bed of the transport vehicle. Alternatively, the track further includes a plurality of rollers of the track. In one configuration, each of the plurality of rollers of the track further includes a locking mechanism on each of the plurality of rollers.

DETAILED DESCRIPTION OF THE DRAWINGS

Described herein are embodiments of systems and methods for a framework assembly for a motorcycle mount. The terms "motorcycle" and "motorcycles" are used in various places in this document and are intended to include, but not be limited to, two-wheeled vehicles such as dirt bikes, MX bikes, motocross bikes, on-off road motorcycles, street bikes, and trail bikes. Embodiments of the motorcycle mount combine a long, rectangular track with rotating arms that rotate upwardly or downwardly providing the user with a convenient means of mounting one or more motorcycles to the bed or floor of a transport vehicle. Many embodiments of the system are designed to work with motocross motorcycles, since those types of motorcycles typically have an aperture in the foot peg of the motor cycle. These apertures accommodate the arms of the framework assembly. In alternative configurations, any vehicle having apertures in pedals or similar apertures can be mounted. The mounting occurs via a pin and plate system in many of the embodiments. In alternatives, this pin and plate system may be replaced with a clamp system or other system that may clamp around the pedal or other feature, slide on the arm, and then be fixed in place by a pin. The foot peg is also commonly referred to as a "foot pedal."

Figure 3:
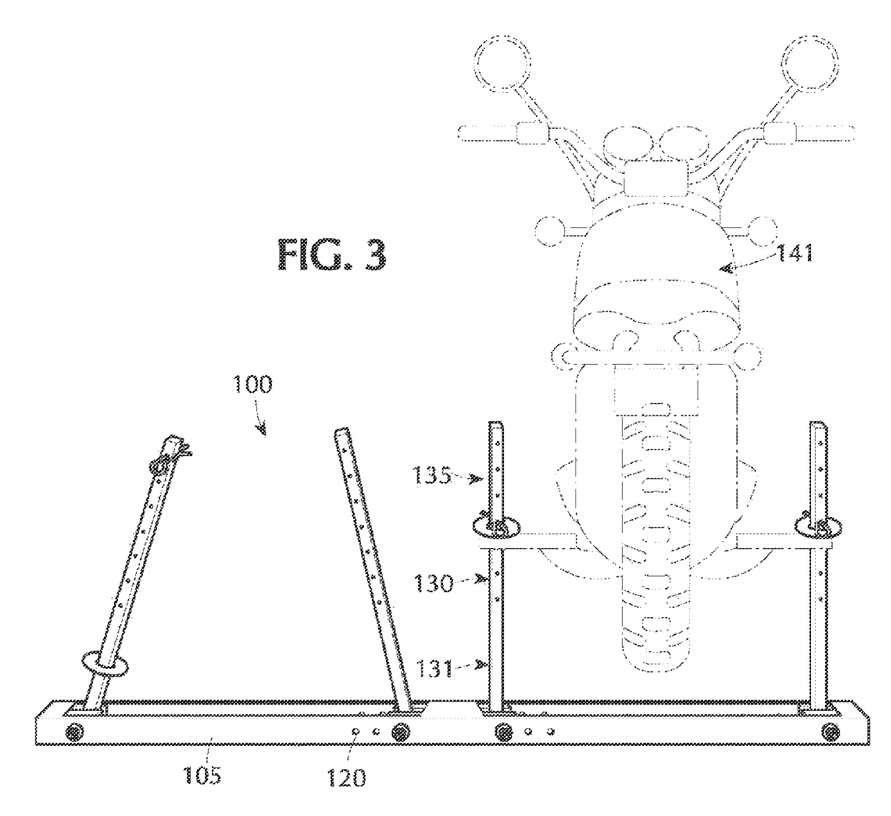
FIG. 3 illustrates a street-bike-type motorcycle (although other types of motorcycles such as motocross or dirt may be used) in a conventional truck bed such that the center of the motorcycle is positioned over and secured by an embodiment of a framework assembly.

FIG. 3 shows a conventional motorcycle, but any two-wheeled vehicle can be used. Motorcycle 141 is secured by a framework assembly 100 in a conventional truck bed. The truck bed refers to any floor large enough to store a motorcycle such as, but not limited to, recreational vehicles, toy hauler recreational vehicles, trucks, and storage units. Motorcycle 141 is secured by a framework assembly 100 in a conventional truck bed such that the center of motorcycle 141 is positioned over a framework assembly 100 and centered between the rightmost arms. The arms are configured such that the arms are raised upwardly, substantially perpendicular to track 105, and through a foot peg 140. In various embodiments, the framework assembly 100 may be bolted directly through the bed of a truck or floor of a transport vehicle such that the framework assembly 100 is secured to the bed or floor of a transport vehicle through apertures for mounting a track 105. The apertures may be spaced according to the standard receivers of a truck bed or floor of a transport vehicle. Many trucks come with standard mounting areas that may receive a bolt or other connector. In another configuration, framework assembly 100 may be removably secured to the truck bed or floor of a transport vehicle. Track 105 may include a plurality of rollers positioned near each arm 130 allowing the user to roll framework assembly 100 onto the bed and position framework assembly 100 along the y-axis of the truck bed. Each roller may include a locking mechanism to secure framework assembly 100 without requiring installation of framework assembly 100 onto the truck bed. When the locking mechanism included on each roller is engaged and at least one motorcycle is secured, framework assembly 100 provides lateral stability to the secured at least one motorcycle and further prevents y-axis movement of the at least one secured motorcycle. When framework assembly 100 with track 105 that includes rollers is not in use, the user may disengage the locking mechanism included on each roller and roll framework assembly 100 out of the truck bed or floor of a transport vehicle.

Figure 1:
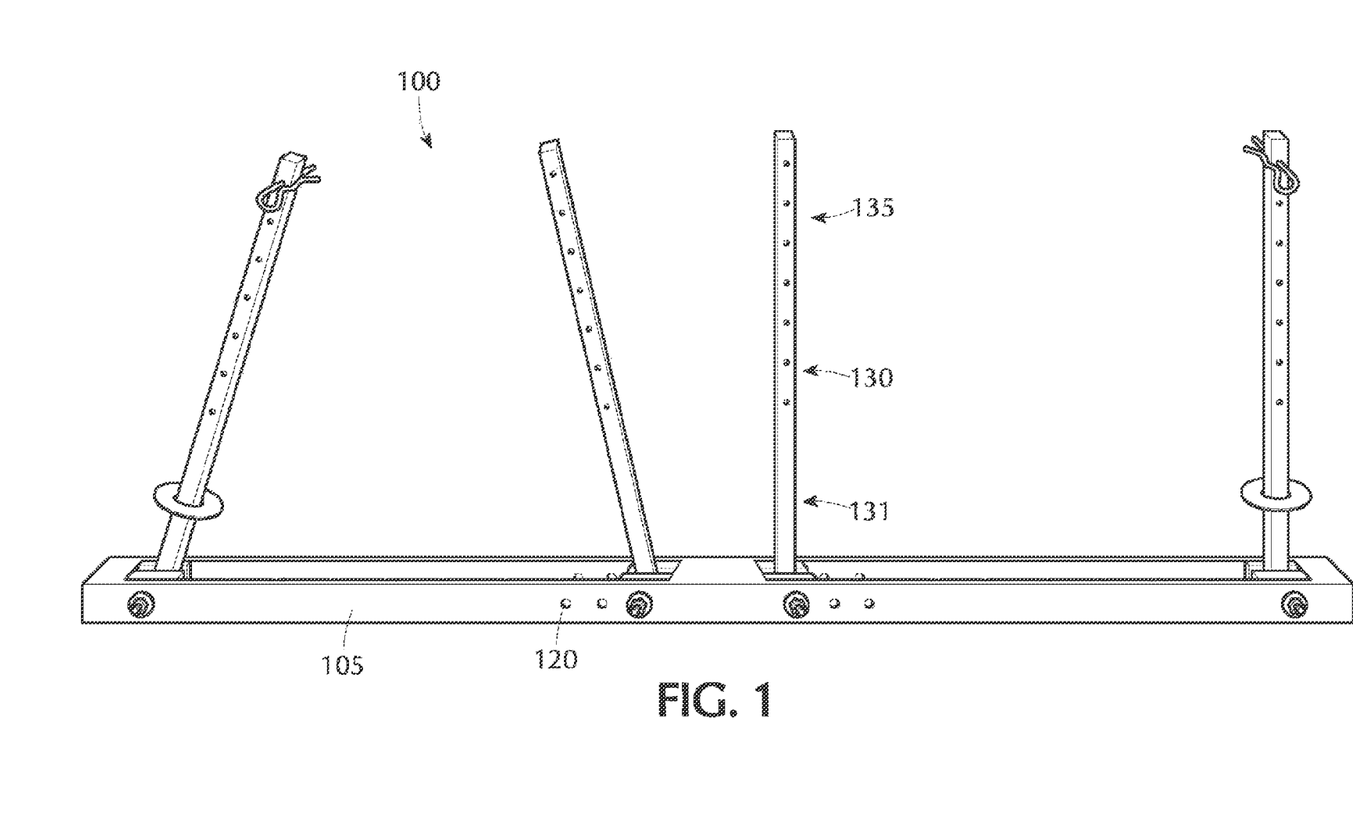
FIG. 1 illustrates a side perspective view of one embodiment of a framework assembly where the arms are rotated upwardly.

Furthermore, in one embodiment, framework assembly 100 may be approximately 24 inches in length having a capacity to secure one motorcycle to the bed of a truck or the floor of a transport vehicle. Alternatively, the framework assembly 100 may be approximately 48 inches in length, having a capacity to secure two motorcycles to the bed of a truck or the floor of a transport vehicle, as shown in FIG. 1. Optionally, the framework assembly 100 may be approximately 48 inches in length having a capacity to secure at least one motorcycle to the bed of a truck or the floor of a transport vehicle. In another embodiment, framework assembly 100 has the capacity to secure at least two motorcycles to the bed of a truck or the floor of a transport vehicle.

Figure 4:
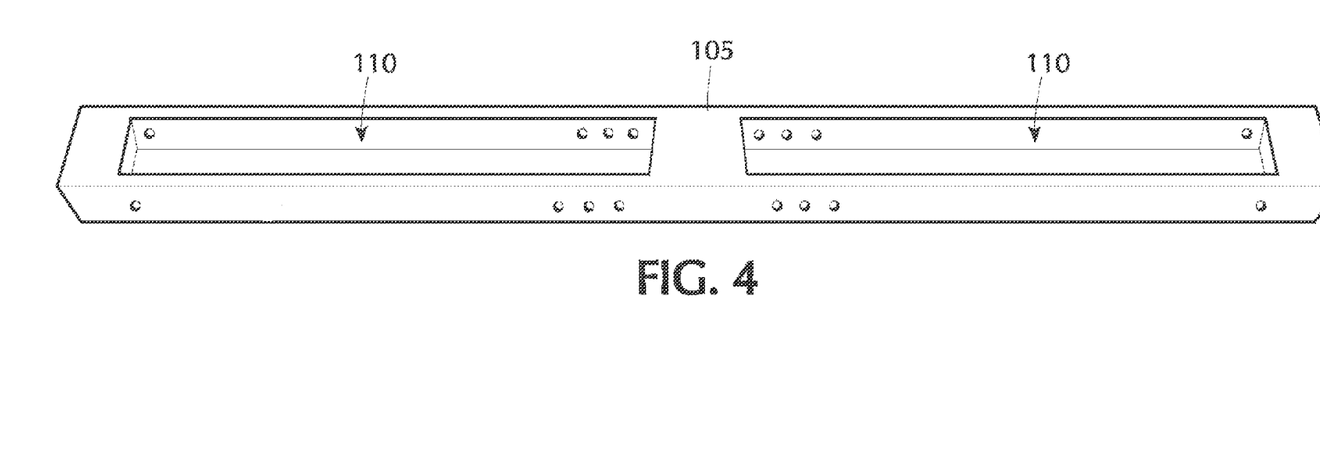
FIG. 4 illustrates a top perspective view of the framework assembly of FIG. 1 where the arms depicted in FIGS. 1 and 2 are removed.

FIGS. 1 and 4 show one embodiment of a framework assembly 100. Framework assembly 100 includes a track 105 which includes a longitudinal open channel 110 and a plurality of pairs of holes 120 carved into the substantially vertical sides of track 105 such that framework assembly 100 is capable of accommodating different motorcycle widths. Furthermore, FIG. 1 shows one embodiment of the framework assembly 100 with a plurality of arms 130 such that each arm 130 is raised in the upward position.

FIGS. 1 and 3 show one embodiment of track 105 which includes a plurality of pairs of holes 120 in the substantially vertical sides of track 105 arranged stepwise such that posts 134 may secure arms 130 at various positions on the track to accommodate various motorcycle widths. In various embodiments, posts 134 may be positioned to secure arms 130 on track 105 such that arms 130 may be 18 inches, 16 inches, or 14 inches apart.

Figure 5:
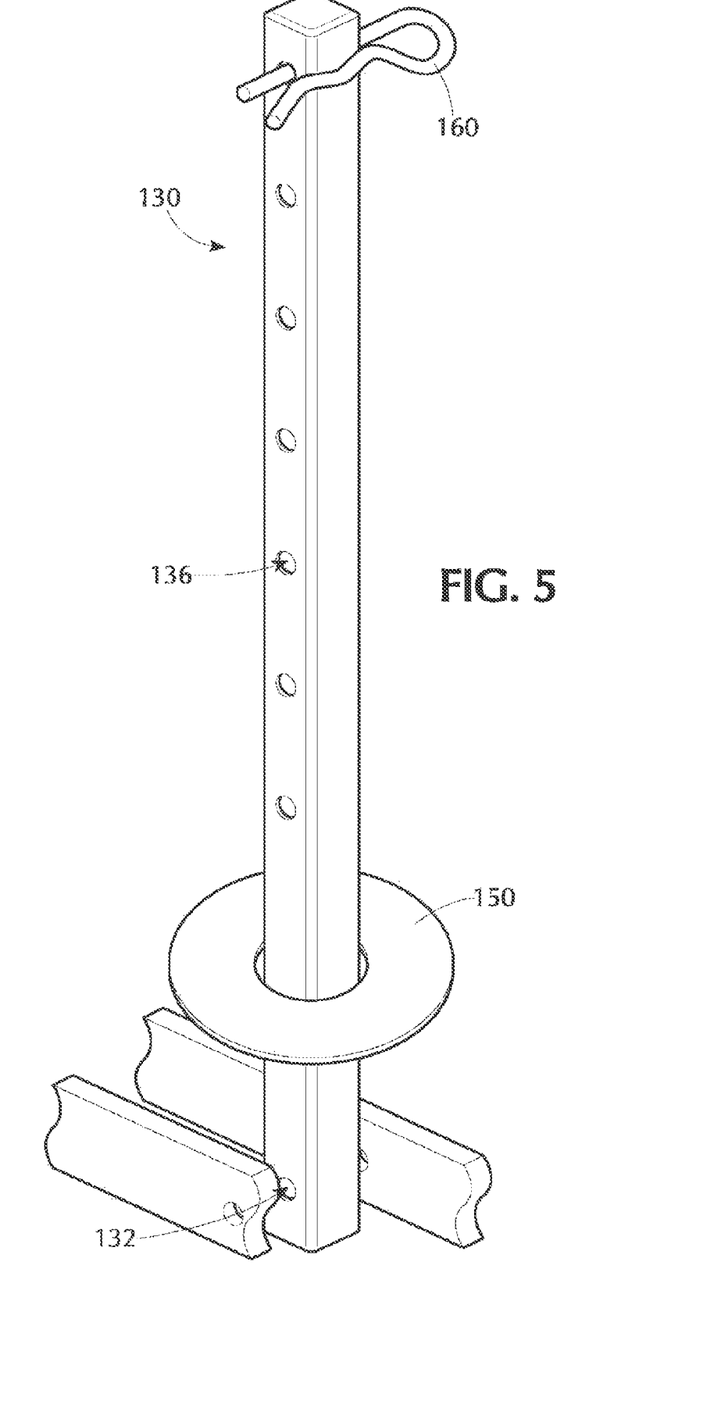
FIG. 5 illustrates a side perspective view of one of the arms of the framework assembly of FIG. 1.

FIG. 5 shows one embodiment of an arm 130. The arm 130 of the plurality of arms 130 is comprised of a lower end 131 and an upper end 135 of each of the plurality of arms 130. The lower end portion of each arm 130 includes hole 132 and a separate hole opposite of hole 132, each hole carved out as 5/16 of an inch in diameter. Various alternatives may include differently sized holes.

Furthermore, each arm 130 of the plurality of arms 130 is comprised of an upper end portion 135 which includes a plurality of pairs of holes, each hole 136 being 3/16 of an inch in diameter. Various alternatives may include different sizes of each hole 136. By arranging each hole 136 in a stepped fashion up the shaft of the upper end portion 135 of each arm 130, upper end 135 of each arm 130 can accommodate multiple sized motorcycles. Upper end portion 135 of each arm 130 of the plurality of arms 130 is raised upwardly and inserted through a foot peg 140 of a motorcycle 141, and a plate 150 that slides down the shaft of each arm 130 of the plurality of arms 130, plate 150 resting on top of foot peg 140 of motorcycle 141. Optionally, motorcycle 141 is pushed down slightly prior to being locked in place with plates 150 such that motorcycle 141 is optimally secured. The spring-loaded motorcycle shocks exert a force upward against the secured plate. By using the foot pedals to secure the motorcycle, the framework assembly 100 pulls the front and rear suspension of the motorcycle down evenly.

Figure 2:
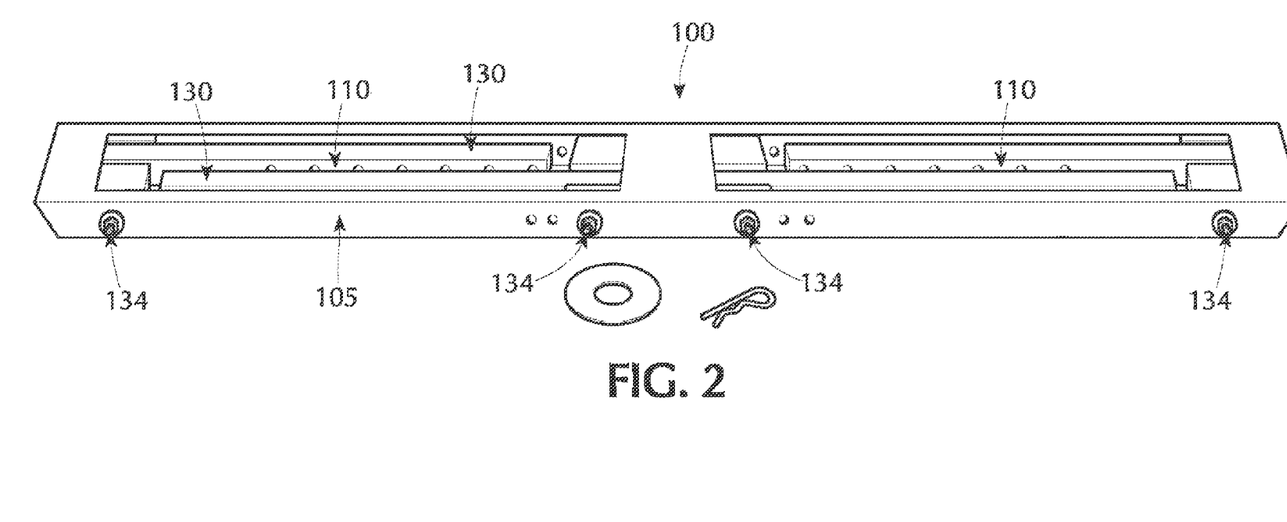
FIG. 2 illustrates a top perspective view of the framework assembly of FIG. 1 where the arms are rotated downwardly.

FIGS. 2 and 4 show one embodiment of the framework assembly 100 which has each arm 130 of the plurality of arms 130 rotated downwardly in a storage position as to reduce the overall footprint of framework assembly 100 when a motorcycle is not being transported. As such, each arm 130 that is rotated downwardly may rest in longitudinal open channel 110 of framework assembly 100. This provides an advantage, in that arms 130 and the entirety of framework assembly 100 interfere minimally with the usage of the bed of the truck or transport vehicle.

Figure 6:
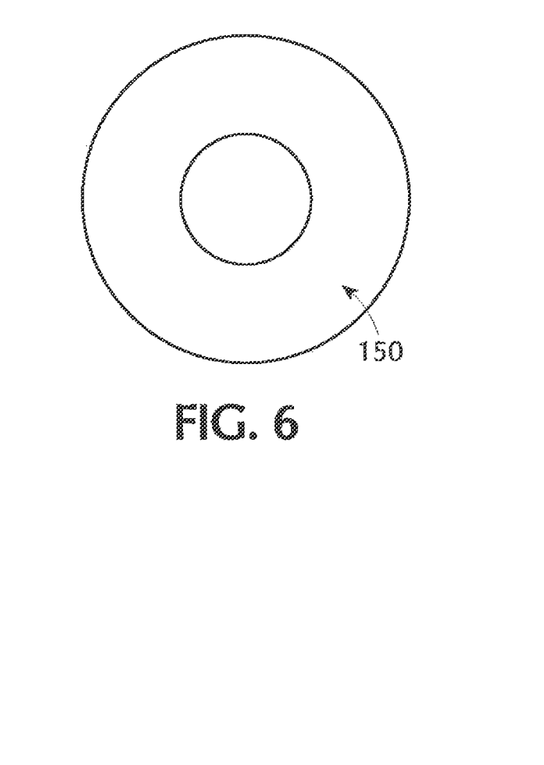
FIG. 6 illustrates a top perspective view of the plate that slides on the arm of the framework assembly of FIG. 1.
Figure 7:
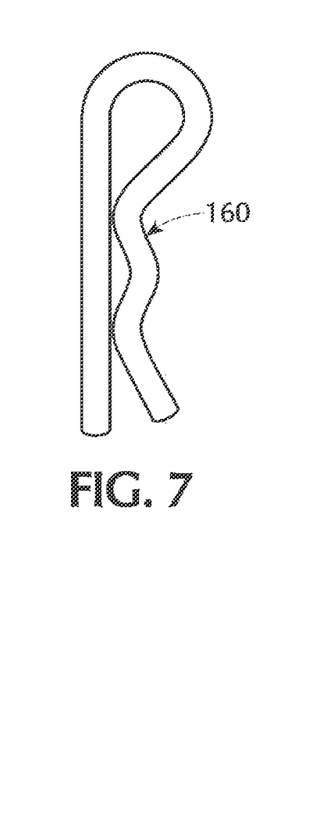
FIG. 7 illustrates a top perspective view of the pin that slides above the plate and through the arm of the framework assembly of FIG. 1.

FIGS. 3, 6, and 7 shows one embodiment of each arm 130 of the plurality of arms 130 which includes plate 150. The shape of plate 150 may vary in shape such as, but not limited to, circular, square, and rectangular. Furthermore, once plate 150 is resting on top of foot peg 140 of motorcycle 141, a pin 160 is inserted through the closest hole 136 above plate 150, securing motorcycle 141 to framework assembly 100. In various embodiments, pin 160 is a cotter pin.

One embodiment of a method of use of the framework assembly 100 includes attaching the framework assembly 100 to the bed of a truck. The bed of the truck includes apertures for receiving bolts at regularly spaced intervals. Alternatively, the apertures may be drilled in the bed of the truck. Track 105 includes apertures that may line up with the apertures in the bed of the truck. Track 105 is placed to line up with these apertures. Bolts then are placed through the apertures and fastened in place.

While specific embodiments have been described in detail in the foregoing detailed description, it will be appreciated by those skilled in the art that various modifications and alternatives to those details could be developed in light of the overall teachings of the disclosure and the broad inventive concepts thereof. It is understood, therefore, that the scope of this disclosure is not limited to the particular examples and implementations disclosed herein but is intended to cover modifications within the spirit and scope thereof as defined by the appended claims and any and all equivalents thereof.

The invention claimed is:

1. A framework assembly apparatus for use with a motorcycle in a transport vehicle having a bed, wherein said motorcycle has a foot pedal, the framework assembly comprising:
   a track having a longitudinal open channel, the track attached to the bed;
   an arm, the arm having an upper end, said upper end engaging said foot pedal, said arm further having a lower end, said lower end connected to said track such that said arm pivots upwardly and downwardly from a fixed position on said track; and
   a holder engaging the foot pedal and the arm in order to hold the motorcycle to the bed of the transport vehicle;
   wherein the fixed position of the arm on the track is oriented such that the arm pivots into the longitudinal open channel such that it is approximately parallel with the longitudinal open channel in a first position and away from the longitudinal open channel such that it is not parallel with the longitudinal open channel in a second position; and
   wherein the holder includes:
   a sliding plate which slides on said arm and engages said foot pedal of the motorcycle; and
   a pin inserted into said arm such that said pin secures said sliding plate over said foot pedal of the motorcycle, thereby holding the motorcycle to the bed for transport.

2. The framework assembly apparatus of claim 1, wherein said pin is a cotter pin.

3. The framework assembly apparatus of claim 1, wherein said track includes a connector that attaches said track to said bed of said transport vehicle.

4. The framework assembly apparatus of claim 1, wherein said arm pivots such that said arm is substantially encapsulated in said longitudinal open channel of said track.

5. The framework assembly apparatus of claim 1, wherein said track further includes a pair of holes wherein a first hole of the pair of holes is positioned opposite a second hole of the pair of holes; and wherein said lower end of said arm includes a first hole of said lower end of the arm positioned opposite of a second hole of said lower end of said arm; and the framework assembly further comprises:
   a post inserted through the first hole of the pair of holes of the track, the first hole of said lower end of the arm, the second hole of said lower end of the arm, and the second hole of the pair of holes of said track.

6. A method of using a framework assembly to secure a motorcycle in a transport vehicle having a bed, wherein said motorcycle has a first foot peg and a second foot peg, the method comprising:

providing the framework assembly, the framework assembly including:
- a track having a longitudinal open channel;
- a first arm and a second arm, the first arm having a first upper end, the first upper end engaging the first foot peg, the second arm having a second upper end, the second upper end engaging the second foot peg, the first arm further having a first lower end, the first lower end connected to the track such that the first arm pivots upwardly and downwardly from a first fixed position on the track, the second arm further having a second lower end, the second lower end connected to the track such that the second arm pivots upwardly and downwardly from a second fixed position on the track;
- a first sliding plate which slides on the first arm and engages the first foot peg of the motorcycle; and
- a first pin inserted into the first arm such that the first pin secures the first sliding plate over the first foot peg of the motorcycle, thereby holding the motorcycle to a bed of a truck or a floor of the transport vehicle for transport;
- attaching said track to the bed of the truck or the floor of the transport vehicle;
- aligning the motorcycle with the track;
- aligning the first foot peg with the first arm;
- placing the first arm through the first foot peg;
- applying a downward force to the motorcycle;
- compressing a suspension system of the motorcycle;
- sliding the first sliding plate onto the first arm on top of the first peg; and
- placing the first pin through the first arm over the first sliding plate.

7. The method of using a framework assembly of claim 6, wherein the framework assembly includes a second sliding plate which slides on the second arm and engages the second foot peg of the motorcycle; and a second pin inserted into the second arm such that the second pin secures the second sliding plate over the second foot peg of the motorcycle, thereby holding the motorcycle to the bed of the truck or the floor of the transport vehicle for transport; the method further comprising:
- sliding the second sliding plate onto the second arm on top of the second peg; and
- placing the second pin through the second arm over the second sliding plate.

8. The method of claim 7, further comprising:
removing the first pin and the second pin;
removing the first arm and the second arm from the first foot peg and the second foot peg, respectively; and
releasing the motorcycle.

9. The method of claim 8, further comprising:
folding the first arm and the second arm into the longitudinal channel.

10. A framework assembly apparatus for use with a motorcycle in a transport vehicle having a bed, wherein said motorcycle has a first foot peg and a second foot peg, the framework assembly comprising:
a track having a longitudinal open channel;
a first arm and a second arm, the first arm having a first upper end, said first upper end engaging said first foot peg, said second arm having a second upper end, said second upper end engaging said second foot peg, said first arm further having a first lower end, said first lower end connected to said track such that the first arm pivots upwardly and downwardly from a first fixed position on said track, said second arm further having a second lower end, said second lower end connected to said track such that said second arm pivots upwardly and downwardly from a second fixed position on said track;
a first sliding plate which slides on said first arm and engages said first foot peg of the motorcycle; and
a first pin inserted into the first arm such that the pin secures the first sliding plate over the first foot peg of the motorcycle, thereby holding the motorcycle to a bed of a truck or a floor of the transport vehicle for transport.

11. The system of claim 10, wherein said first arm and said second arm rotate downward such that said first arm and said second arm are substantially encapsulated in said longitudinal open channel of said track.

12. The system of claim 10, wherein said first pin is a cotter pin.

13. The system of claim 10, wherein said track includes a plurality of pairs of holes wherein a first hole of said plurality of pairs of holes is positioned opposite a second hole of said plurality of pairs of holes on opposite sides of said longitudinal open channel.

14. The system of claim 13, wherein said first lower end of said first arm includes a first hole and a second hole, and said second lower end of said second arm includes a first hole and a second hole.

15. The system of claim 14, wherein said first hole of said first lower end of said first arm is opposite of said second hole of said first lower end of said first arm, and wherein said first hole of said second lower end of said second arm is opposite of said second hole of said second lower end of said second arm.

16. The system of claim 15, wherein a first post is inserted through a first hole of a first pair of holes of said plurality of pairs of holes of said track, through said first hole of said first lower end of said first arm, and through said second hole of said first lower end of said first arm.

17. The system of claim 16, wherein a second post is inserted through a first hole of a second pair of holes of said plurality of pairs of holes of said track, through said first hole of said second lower end of said second arm, and through said second hole of said second lower end of said second arm.

18. The system of claim 10, wherein said track is attachable to said bed of said truck or the floor of the transport vehicle.

19. The system of claim 10, wherein said track further includes a plurality of rollers of said track.

20. The system of claim 19, wherein each of said plurality of rollers of said track further includes a locking mechanism on each of said plurality of rollers.

* * * * *